United States Patent
Capllonch et al.

(10) Patent No.: US 10,330,230 B2
(45) Date of Patent: Jun. 25, 2019

(54) SYSTEM FOR AUTO-ALIGNMENT AND TENSIONING OF FLEXIBLE PIPES IN A STATIONARY PRODUCTION UNIT, AND METHOD FOR INSTALLING FLEXIBLE PIPES THEREBY

(71) Applicant: PETROLEO BRASILEIRO S.A.—PETROBRAS, Rio de Janeiro, RJ (BR)

(72) Inventors: Ricardo Wagner Capllonch, Teresopolis (BR); Carlos Alberto Duarte de Lemos, Rio de Janeiro (BR); Anderson Barata Custodio, Rio de Janeiro (BR); Eduardo Vardaro, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 15/783,257

(22) Filed: Oct. 13, 2017

(65) Prior Publication Data
US 2018/0106406 A1    Apr. 19, 2018

(30) Foreign Application Priority Data
Oct. 18, 2016  (BR) ........................ 10 2016 024269

(51) Int. Cl.
*E21B 17/01*    (2006.01)
*E21B 19/00*    (2006.01)
(Continued)

(52) U.S. Cl.
CPC .......... *F16L 33/32* (2013.01); *B63B 35/4413* (2013.01); *F16L 1/23* (2013.01); *F16L 23/02* (2013.01); *B63B 2035/448* (2013.01)

(58) Field of Classification Search
CPC ...... E21B 17/01; E21B 17/015; E21B 17/017; E21B 19/004; E21B 43/0107; F16L 1/23;
(Continued)

(56) References Cited

U.S. PATENT DOCUMENTS 4,102,146 A * 7/1978 Dietrich ................ E21B 43/013
                                                    166/343
4,643,614 A * 2/1987 Laursen ................ E21B 17/015
                                                    166/350
(Continued)

FOREIGN PATENT DOCUMENTS

BR      PI 0803358-7 A2    6/2010
WO      WO-2008152289 A2 * 12/2008 ........... E21B 17/015
WO      2015/104560 A1     7/2015

*Primary Examiner* — Matthew R Buck
(74) *Attorney, Agent, or Firm* — Sughrue Mion, PLLC (57) ABSTRACT

The present invention provides a system for auto-alignment and tensioning of flexible pipes (24) in a stationary production unit, said system comprising (i) at least one tensioner (10) comprising an upper cone (10s) and a lower cone (10i), the upper cone (10s) and the lower cone (10i) being fixed together and forming a symmetrical double cone structure provided with an internally hollow cylindrical opening suitable for passage of a flexible pipe (24), (ii) at least one supporting fork (12) with pivoted connection to the at least one tensioner (10) and (iii) at least one coupling device (16) which, at a first end, is connected detachably to the at least one supporting fork (12) and, at a second end, is connected to the stationary production unit. A method for installing flexible pipes by means of said system is also provided.

15 Claims, 5 Drawing Sheets

(51) Int. Cl.
*F16L 1/23* (2006.01)
*F16L 33/32* (2006.01)
*B63B 35/44* (2006.01)
*F16L 23/02* (2006.01)

(58) Field of Classification Search
CPC . F16L 33/32; B63B 35/4413; B63B 2035/448
See application file for complete search history.

(56) References Cited

U.S. PATENT DOCUMENTS

| | | | | |
|---|---|---|---|---|
| 4,708,525 A * | 11/1987 | Beynet | ................ | B63B 21/502 166/367 |
| 4,808,034 A * | 2/1989 | Birch | .................... | B63B 27/24 166/367 |
| 5,269,629 A * | 12/1993 | Langner | ............... | F16L 27/103 166/367 |
| 5,320,175 A * | 6/1994 | Ritter | ................... | E21B 43/013 166/339 |
| 5,437,518 A * | 8/1995 | Maloberti | ............ | E21B 17/017 166/342 |
| 5,807,027 A * | 9/1998 | Ostergaard | .......... | E21B 43/0135 166/338 |
| 6,558,084 B2 * | 5/2003 | Moog | ................... | E21B 19/004 114/230.3 |
| 6,685,397 B1 * | 2/2004 | Dixon-Roche | ....... | E21B 17/015 166/352 |
| 6,739,804 B1 * | 5/2004 | Haun | .................... | E21B 17/015 166/355 |
| 6,902,199 B2 * | 6/2005 | Colyer | .................. | E21B 33/038 285/29 |
| 7,044,228 B2 * | 5/2006 | Langford | ........... | B01D 17/0211 166/343 |
| 7,069,958 B2 * | 7/2006 | Filho | ..................... | E21B 17/017 138/106 |
| 7,600,569 B2 * | 10/2009 | Routeau | ............... | E21B 43/0135 166/344 |
| 8,267,179 B2 * | 9/2012 | Butcher | .............. | E21B 43/0107 166/341 |
| 8,418,766 B2 * | 4/2013 | Luppi | ................... | E21B 43/013 166/338 |
| 8,550,171 B2 * | 10/2013 | Wajnikonis | ........... | E21B 17/015 166/346 |
| 2008/0286050 A1 * | 11/2008 | DeLack | ................ | E21B 41/04 405/172 |

\* cited by examiner

SYSTEM FOR AUTO-ALIGNMENT AND TENSIONING OF FLEXIBLE PIPES IN A STATIONARY PRODUCTION UNIT, AND METHOD FOR INSTALLING FLEXIBLE PIPES THEREBY

CROSS-REFERENCE TO RELATED APPLICATION

This application claims the benefit of priority to BR 10 2016 024269-0, filed 18 Oct. 2016, which is incorporated herein by reference in its entirety.

FIELD OF THE INVENTION

The present invention relates to systems for supporting and aligning risers. More specifically, the present invention relates to a system for guiding the riser on arrival of a floating vessel.

BACKGROUND OF THE INVENTION

With the discovery of hydrocarbon-producing fields located at ever increasing water depths, the use of rigid structures fixed on the sea bed, intended for installation of production equipment, has become more complex by the day. In some cases, owing to the particular conditions of the region where the hydrocarbon producing field is located, their use has become unviable.

In more recent times, floating structures represent an alternative that is used more and more frequently for the installation of production equipment, as they normally offer a lower-cost option compared to fixed structures.

Petroleum production in deep water makes extensive use of riser pipes, also known as risers. This tubing, which may be flexible or rigid, collects the oil produced by the subsea well, and conveys it to a floating unit, and then to tankers or directly to onshore installations. As the floating structures move, the risers are subjected to cyclic flexure that causes their radii of curvature to vary, which causes fatigue in the region of transfer of shearing forces to the floating unit.

In this scenario, devices known as tensioners are used for protecting flexible risers and umbilicals from being bent at radii less than their minimum permissible radii. The tensioners achieve this by increasing the flexural rigidity in a particular section of the riser. The majority of tensioners are in the form of truncated-cone sections, and are made of elastomeric materials.

The tensioners may be fixed to the floating units in various ways, such as by means of devices called bell mouths, fastened by means of flanges, inserted in conical seatings or inserted in cylindrical devices that have some form of fixation.

The tensioners of the prior art must be dimensioned in such a way as to prevent fatigue of the flexible risers for the design life. The increase in working depth of floating units implies an increase in the tensile loads on the flexible risers. Also, with the movement of the vessel and of the pipes due to currents, there is an increase of the loads from shearing forces and bending moment in the system for fixing the pipes to the platform.

In this scenario of deep-water oil exploration, the increased dimensions and the higher loadings require the use of fixing structures of large dimensions for the tensioners. This makes their distribution and allocation difficult in new floating units. Furthermore, this increase in dimensions makes handling of the tensioners more and more difficult. This increases the offshore working time for installation and dismantling of the flexible risers. The total cost of installation of the floating unit increases not only through the unit cost of each tensioner, but also through the working time of the ships and teams employed for installation of the flexible risers.

In addition to the problem of the increased size and weight of the tensioners and their fixing structures, it is known that, during the basic engineering phase of the design of a platform, it is necessary for the designers to have information about the diameters and top and azimuth angles of all the risers that will be supported by the platform. However, at present, the data are still not available. Estimates are made based on similar platforms and the data obtained are employed in the design. When the basic arrangement with which the platform will work is finally released, there are often discrepancies relative to the initial estimates. As an example, there have already been cases where platforms had to undergo modifications for adaptation to the new scenario, including returning to dry dock, which delays the start of operation and causes enormous losses.

In an attempt to solve the aforementioned problems, document PI0803358-7 discloses a symmetrical tensioner with swivel joint, which comprises a lower protective cone, an upper protective cone, a swivel joint, a spherical bearing and a centralizer. Since it comprises a certain degree of mobility owing to the presence of the swivel joint, the symmetrical tensioner with swivel joint of document PI0803358-7 attenuates the bending moment transmitted to the structure for fixing the tensioner to the platform. In this way, the symmetrical tensioner with swivel joint of document PI0803358-7 may have smaller dimensions than a conventional tensioner of the same loading capacity, which facilitates its fabrication, transport, handling, positioning and installation in a production unit.

However, the symmetrical tensioner with swivel joint described in document PI0803358-7 does not satisfactorily solve the problems of the prior art. This is because, due to the limitation of movement inherent in a system with swivel joint, it cannot completely alleviate the bending moment stresses and shearing force. In addition, for the same reason, the symmetrical tensioner with swivel joint described in document PI0803358-7 does not allow sufficient compensation if there are significant changes in the design in relation to the top and azimuth angles of the pipes, depending on the arrangement of wells and components on the sea bed. Moreover, the symmetrical tensioner with swivel joint described in document PI0803358-7 is of complex assembly, installation and maintenance, due to the manner in which the components are interconnected.

Other alternatives in the prior art also do not satisfactorily solve the aforementioned problems. Document WO2015104560, for example, discloses a segmented tensioner formed from two or more segments, each segment comprising a male end and a female end for engaging with the adjacent segment. The interface between the segments provides a small deflection between them, sufficient to reduce the stresses in the tensioner. However, the solution presented in document WO2015104560 is very complex in assembly, installation and maintenance mainly owing to the large number of moving parts.

In addition, it is known that the method for installing flexible risers (known as pull-in) employed conventionally in the prior art requires an excessive expenditure of time, with employment of a diver and mobilization of support ships. Unfavourable sea conditions may even require suspension of the installation work, since at present there are no methods of installation that are independent of the weather conditions. This results in delays in the production of the well associated with the riser.

As will be presented in more detail below, the present disclosure aims to solve the problems of the prior art described above in a practical and efficient manner and at low cost.

SUMMARY OF THE INVENTION

A first aim of the present disclosure is to provide a system for auto-alignment and tensioning of flexible pipes in a stationary production unit comprising a mechanism capable of significantly alleviating the bending moment stresses and shearing force.

A second aim of the present disclosure is to provide a system for auto-alignment and tensioning of flexible pipes in a stationary production unit comprising a mechanism capable of providing sufficient compensation for the case when there are significant changes in the design with respect to the top and azimuth angles of the pipes, depending on the arrangement of wells and components on the sea bed.

A third aim of the present disclosure is to provide a method for installing flexible pipes by means of the aforementioned system for auto-alignment and tensioning of flexible pipes that can be executed quickly and easily even in adverse sea conditions.

A fourth aim of the present disclosure is to provide a method for installing flexible pipes by means of the aforementioned system for auto-alignment and tensioning of flexible pipes that dispenses with the need for divers and consequently support ships for the diving operations.

In order to achieve the aim described above, the present disclosure provides a system for auto-alignment and tensioning of flexible pipes in a stationary production unit, said system comprising at least some of: a tensioner provided with an internal opening suitable for passage of a flexible pipe, a supporting fork, pivotally connected to the tensioner; and a coupling device which, at a first end, is configured to detachably connect to the supporting fork and, at a second end, is configured to connect to a stationary production unit.

Also disclosed is a method for installing a flexible pipe, wherein the method comprises at least some of the steps of: providing a flexible pipe with a tensioner, the tensioner having a supporting fork pivotally attached to the tensioner; connecting a main cable to an upper end of the flexible pipe, the main cable being tensionable by a first tensioning device positioned in a stationary production unit; connecting an auxiliary cable to a coupling pin of the supporting fork, the auxiliary cable passing through a pocket of the coupling device and being tensionable by a second tensioning device positioned in the stationary production unit; tensioning the auxiliary cable until the coupling pin of the supporting fork enters the pocket of the coupling device and is secured therein by a locking device; and tensioning the main cable so as to raise the flexible pipe that passes through the tensioner until an upper end of the main cable reaches a location for fixing the upper end in the stationary production unit.

Also disclosed is a system for auto-alignment and tensioning of flexible pipes in a stationary production unit, said system comprising (i) at least one tensioner comprising an upper cone and a lower cone, the upper and lower cones being fixed together and forming a symmetrical double cone structure provided with an internally hollow cylindrical opening suitable for passage of a flexible pipe, (ii) at least one supporting fork with pivoted connection to the at least one tensioner and (iii) at least one coupling device which, at a first end, is connected detachably to the at least one supporting fork and, at a second end, is connected to the stationary production unit.

In some aspects, there is further disclosed a system in which fixation between the upper cone and the lower cone is carried out by means of a fixing ring.

In some aspects, there is further disclosed a system in which the fixing ring is divided into two parts, each part having a conical internal profile suitable for locking the upper cone and the lower cone against one another when the two parts are pressed against one another.

In some aspects, there is further disclosed a system in which the two parts of the fixing ring are fixed against one another by means of at least one of screws, rivets, welds and recesses.

In some aspects, there is further disclosed a system in which the at least one supporting fork has a pivoted connection to the at least one tensioner via the fixing ring.

In some aspects, there is further disclosed a system in which the at least one supporting fork comprises at least one coupling pin suitable for detachable connection to the at least one coupling device.

In some aspects, there is further disclosed a system in which detachable connection of the at least one coupling pin in the at least one coupling device is carried out by lockable fitting of the at least one coupling pin in at least one pocket of the at least one coupling device.

In some aspects, there is further disclosed a system in which detachable connection of the at least one coupling pin in the at least one coupling device is carried out by means of at least one locking device positioned in the at least one pocket of the at least one coupling device, the locking device being suitable for engaging in at least one recess of the at least one coupling pin.

In some aspects, there is further disclosed a system in which the at least one locking device is at least one tongue, comprising one inclined surface and the other straight, the tongue being movable relative to the pocket between a retracted position and an extended position.

In some aspects, there is further disclosed a system in which an elastic device keeps the locking device in the extended position and allows it to move to the retracted position when pressed.

The present disclosure further provides a method for installing flexible pipes by means of a system for auto-alignment and tensioning of flexible pipes in a stationary production unit, as defined above, comprising the steps of (i) connecting a main cable to an upper end of the flexible pipe comprising in its upper portion the at least one tensioner and the at least one supporting fork with pivoted connection to said at least one tensioner, the main cable being tensionable by a first tensioning device positioned in the stationary production unit, (ii) connecting an auxiliary cable to at least one coupling pin of the at least one supporting fork, the auxiliary cable passing through the interior of at least one pocket of the at least one coupling device and being tensionable by a second tensioning device positioned in the stationary production unit, (iii) tensioning the auxiliary cable until the at least one coupling pin of the at least one supporting fork enters the at least one pocket of the at least one coupling device and is secured by at least one locking device and (iv) tensioning the main cable so as to raise the flexible pipe that passes through the at least one tensioner until its upper end reaches a location for fixing it in the stationary production unit.

BRIEF DESCRIPTION OF THE FIGURES

The detailed description presented hereunder refers to the appended figures and their respective reference numbers.

DETAILED DESCRIPTION OF THE INVENTION

Firstly, it is emphasized that the description that follows is based on a preferred embodiment of the disclosure. As will be obvious to a person skilled in the art, however, the disclosure is not limited to this particular embodiment.

Figure 1:
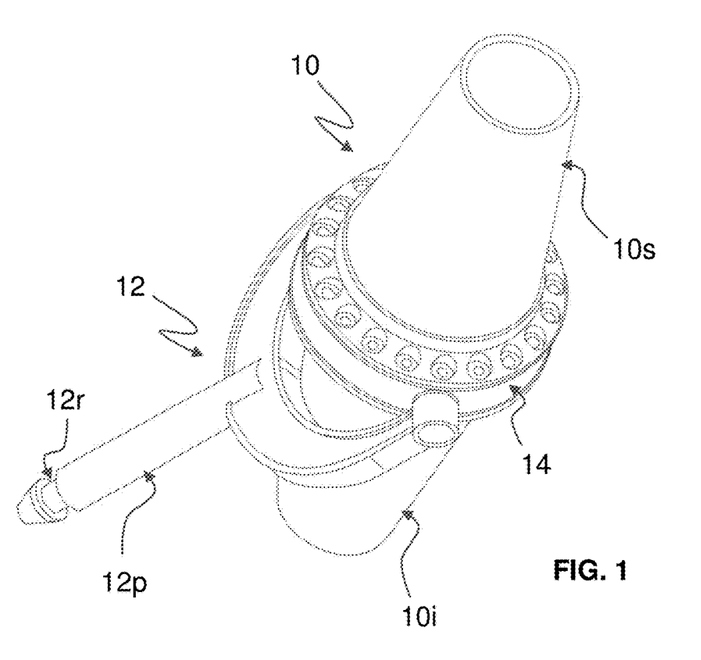
FIG. 1 shows an isometric view of a tensioner that pivots with respect to a supporting fork of the system according to the preferred embodiment of the present disclosure.

FIG. 1 shows an isometric view of a tensioner 10 that pivots with respect to a supporting fork 12 of the system according to the preferred embodiment of the present disclosure.

As can be seen, the system for auto-alignment and tensioning of flexible pipes in a stationary production unit (SPU) of the present disclosure will comprise a tensioner 10 comprising an upper cone 10s and a lower cone 10i, the upper and lower cones 10s, 10i being fixed together and forming a double cone structure provided with a hollow opening 10a within it, suitable for passage of a flexible pipe (not shown). That is, opening 10a passes through the double cone structure, from one end to the other. In some embodiments, the double cone structure can be symmetrical. In some embodiments, the opening is cylindrical. This is to match the profile of the pipe that passes through the tensioner, as such pipes are usually substantially cylindrical.

In some embodiments, the upper and lower cones 10s, 10i are made of a polymer material. However, the upper and lower cones 10s, 10i may be made of various other materials, so long as they provide adequate mechanical strength. Thus, it is stressed that the disclosure is not limited to any specific material.

Figure 2:
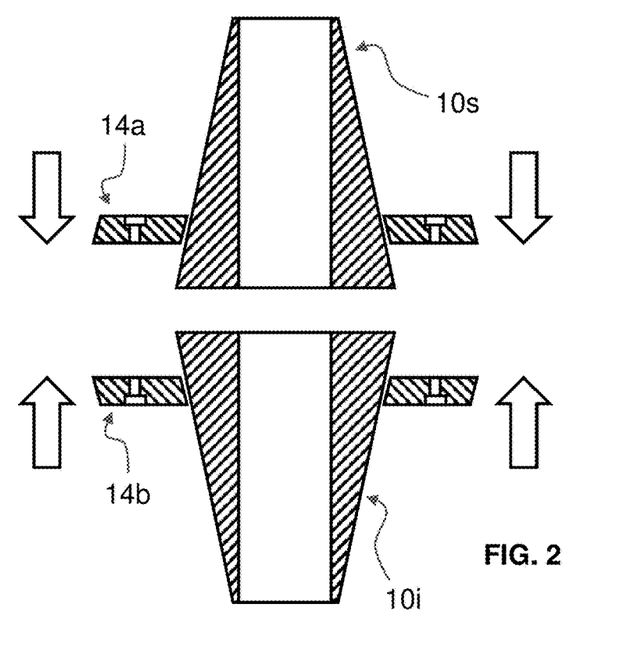
FIG. 2 shows an exploded sectional view of the method of fixing the cones that make up the tensioner through a fixing ring.

In some embodiments, fixation between the upper and lower cones 10s, 10i is provided by a fixing ring 14, as illustrated in FIG. 1. As shown in FIG. 2, which illustrates a sectional view of the upper and lower cones 10s, 10i, the fixing ring 14 is divided into two parts 14a, 14b, each part of the ring having a conical or inclined internal profile. This allows each part 14a, 14b of the fixing ring 14 to pass over the narrower end of one of the cones 10s, 10i, and to approach the wider end. The parts 14a, 14b are thus suitable for locking the upper and lower cones 10s, 10i against one another when the two parts 14a, 14b are passed over opposite ends of the symmetrical double cone structure and are pressed against one another, in the direction indicated by the arrows in FIG. 2.

In some embodiments, the parts 14a, 14b of the fixing ring 14 are fixed with respect to one another by a plurality of screws. Alternatively, any other fixing means known in the prior art, such as rivets, welding or sockets, may be used for fixing the two parts 14a, 14b of the fixing ring 14.

In an alternative embodiment (not shown), the tensioner 10 is formed by a single piece, assembly of the parts thereof not being necessary. In this case, the fixing ring 14 still be provided, for connecting a supporting fork 12, as discussed below. In that case, the supporting ring may be formed as part of the single piece tensioner 10, or may be a separate single piece. If the fixing ring 14 is formed as part of the single piece tensioner 10, the symmetrical double cone shape previously discussed may not be necessary.

In some embodiments, a supporting fork 12 has a pivoted connection to the tensioner via the fixing ring 14. In preferred embodiments, the fixing ring comprises two collinear cylindrical pins (not shown) that project radially outwards, the cylindrical pins defining pivot points. The cylindrical pins can engage in two holes or cylindrical recesses of the supporting fork 12 (not shown), each hole positioned in one of the arms of the supporting fork 12. This can allow hinged connection of the elements. It is emphasized that any mechanism for pivoting connection known in the prior art may be used between the supporting fork 12 and the fixing ring 14. For example, the cylindrical pins may be fixed to the supporting fork 12, while the holes or recesses would be located in the fixing ring 14. Thus, it is emphasized that the present disclosure is not limited to a particular mechanism for providing the pivoting connection.

The provision of the supporting fork 12 and the pivoting connection to the tensioner 10 provides complete articulation of the tensioner 10. This allows significant alleviation of the bending moment stresses and shearing force of the system, independently of the movement of the flexible pipes. Furthermore, this angular mobility allows sufficient compensation for the case when there are significant changes in the design with respect to the top and azimuth angles of the pipes, depending on the arrangement of wells and components on the sea bed.

Figure 3:
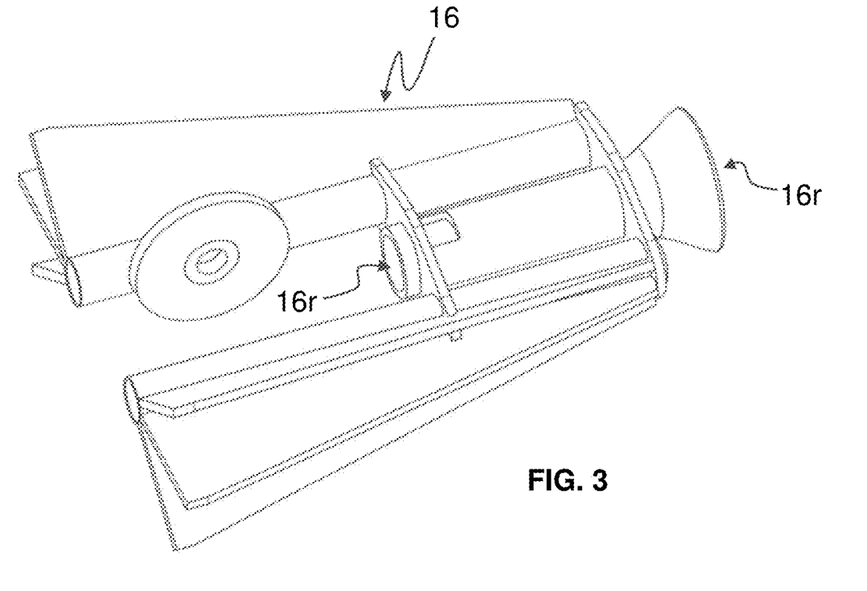
FIG. 3 shows an isometric view of a coupling device of the system according to the preferred embodiment of the present disclosure.
Figure 4:
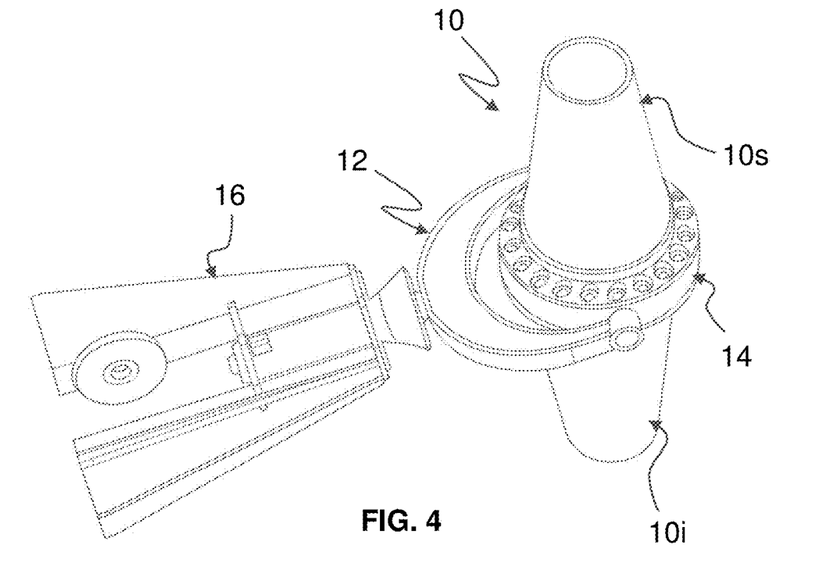
FIG. 4 shows an isometric view of the system according to the preferred embodiment of the present disclosure where the supporting fork is connected to the coupling device.

The system of the present disclosure further comprises a coupling device 16, illustrated in FIGS. 3 and 4. A first end of the coupling device 16 is connected detachably to the at least one supporting fork 12. A second end is connected to the stationary production unit.

In some embodiments, the supporting fork 12 comprises a coupling pin 12p suitable for detachable connection to the coupling device 16. More specifically, detachable connection of the coupling pin 12p in the coupling device 16 can be provided by lockable fitting of the coupling pin 12p in a pocket 16r of the coupling device 16. In particular, the detachable connection of the coupling pin 12p to the pocket 16r of the coupling device 16 can be a quick-coupling connection.

In some embodiments, quick-coupling connection of the coupling pin 12p with the pocket 16r of the coupling device 16 is provided by at least one locking device 18. Locking device 18 can be positioned in the pocket 16r of the coupling device 16. The locking device 18 can be suitable for engaging in a recess 12r of the at least one coupling pin 12p.

Figure 5A:
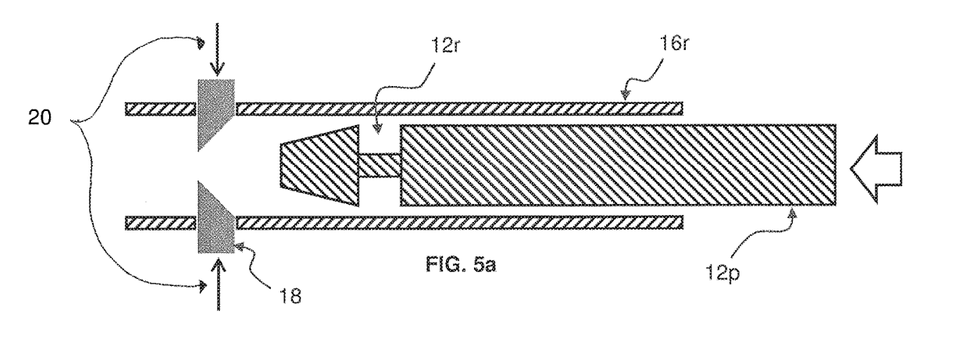
FIGS. 5a, 5b and 5c show sectional views of a coupling pin of the supporting fork engaging in a pocket of the coupling device and being secured by at least one locking device.
Figure 5B:
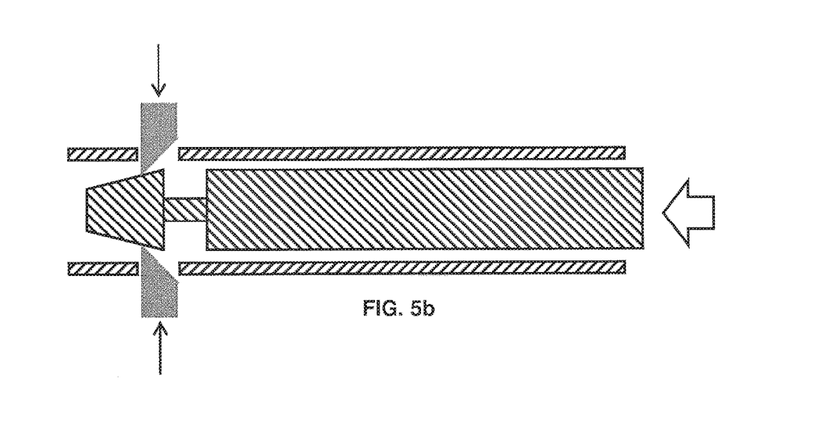
Figure 5C:
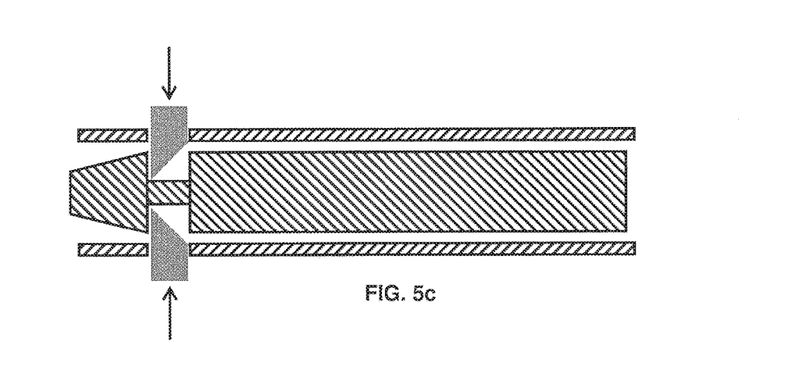

In particular embodiments, the at least one locking device 18 may be one or more tongues, for example two tongues as shown in FIGS. 5a, 5b and 5c. Each tongue can comprise one inclined (with respect to a radial plane of the pocket 16r)

surface and one straight (i.e. lying within a radial plane of the pocket 16r), which meet to form the tip of each tongue. Put another way, each tongue has a surface (the aforementioned inclined surface) that makes an acute angle with the axis of the pocket 16r, along which the coupling pin 12p is inserted, and another surface substantially perpendicular to that axis (the aforementioned straight surface).

The tongues can move relative to the pocket 16r between a retracted position and an extended position, as illustrated in FIGS. 5a, 5b and 5c. In other words, the tongues can move in and out of the pocket 16r, to a certain extent, in a radial plane of the pocket 16r. In some embodiments, an elastic device 20, such as a spring (represented in in FIGS. 5a, 5b by the arrows that push the tongues radially into the pocket), holds the locking device 18 in the extended position (FIG. 5a). The elastic device 20 allows the locking device 18 to move to the retracted position when pressed by the coupling pin 12p.

Thus, when the coupling pin 12p enters the pocket 16r, at a certain point the end of coupling pin 12p comes into contact with the inclined surface of the tongues of locking device 18. This contact can push the locking device 18 to the retracted position (FIG. 5b), pressing against the elastic device 20.

When the locking device 18 encounters the recess 12r of the coupling pin 12p, locking device 18 can return to its extended position, moving into the recess 12r. As a result the straight surface of the locking device 18 locks the coupling pin 12p, preventing it from moving in the opposite direction (FIG. 5c). This is because, even if the coupling pin 12p is pulled back, the contact of the end of the coupling pin 12p with the straight surface of the locking device 18 will not urge the locking device 18 back to the retracted position.

In some embodiments, a stop (not shown) is provided to prevent the coupling pin 12p going farther than necessary into the pocket 16r. This prevents the recess going beyond the locking device 18. In some embodiments, the body of the supporting fork 12, at the joint between the coupling pin 12p and the arms of the supporting fork 12 (which are connected to the tensioner 10), is used as a limiter of entry of the coupling pin into the pocket 16r. In other words, the joint between the coupling pin 12p and the arms of the supporting fork 12 prevent over-insertion of the coupling pin 12p in the pocket 16r.

In some embodiments, the coupling device 16 is fixed to the stationary production unit by a plurality of screws. Alternatively, any other fixing means known in the prior art, such as rivets, welding or recesses, may be used for fixing the coupling device 16 to the stationary production unit. In particular embodiments, the coupling device 16 is fixed to the stationary production unit in a submerged lateral portion of the shell thereof.

Figure 6A:
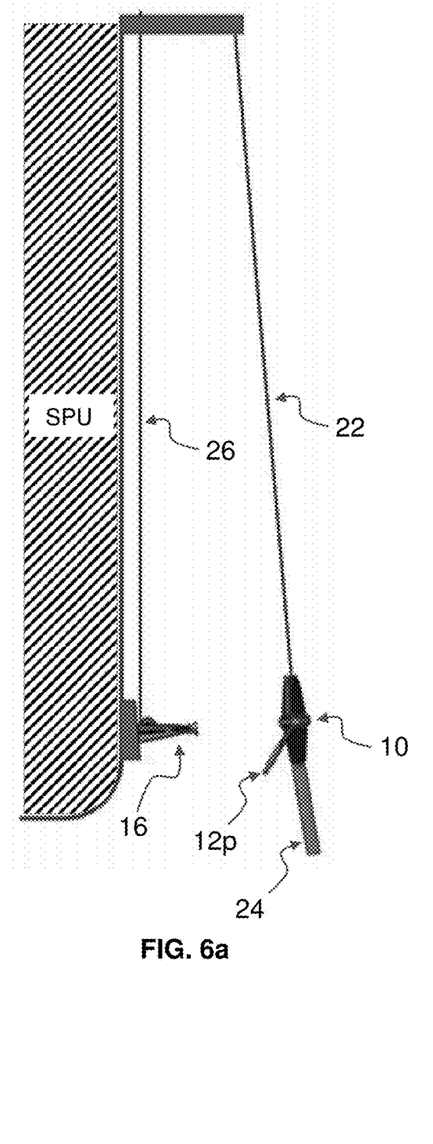
FIGS. 6a, 6b, 6c and 6d illustrate the steps of the method of installation according to the preferred embodiment of the present disclosure.
Figure 6B:
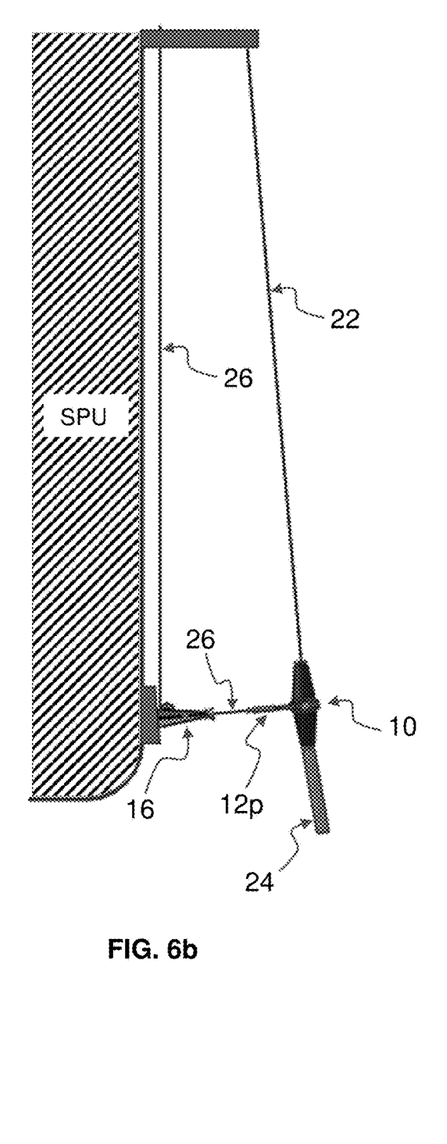
Figure 6C:
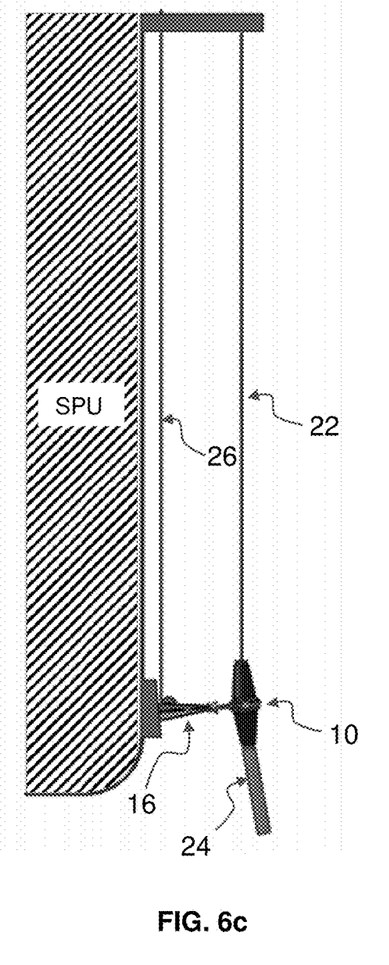
Figure 6D:
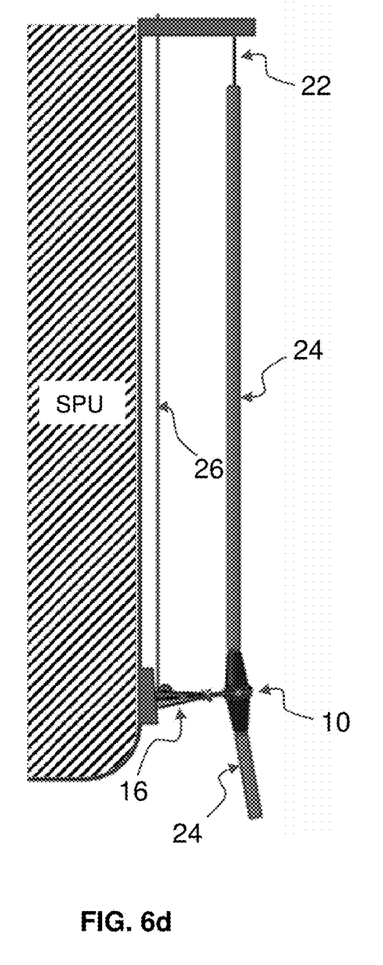

The present disclosure further provides a method for installing flexible pipes by means of the system described above, as illustrated in FIGS. 6a, 6b, 6c and 6d. The method according to the particular embodiment of the present disclosure comprises the following steps:

a) connecting a main cable 22 (also known as a pull-in cable) to an upper end of the flexible pipe 24 comprising in its upper portion the tensioner 10 and the supporting fork 12 with pivoted connection to said tensioner 10, the main cable 22 being tensionable by a first tensioning device, such as a winch, positioned in the stationary production unit, as illustrated in FIG. 6a;

b) connecting an auxiliary cable 26 to the coupling pin 12p of the supporting fork 12, the auxiliary cable 26 passing through the pocket 16r of the coupling device 16 and being tensionable by a second tensioning device, such as a second winch, also positioned in the stationary production unit, as illustrated in FIG. 6b;

c) tensioning the auxiliary cable 26 until the coupling pin 12p of the supporting fork 12 enters the pocket 16r of the coupling device 16 and is secured by the locking device 18, as illustrated in FIG. 6c; and d) tensioning the main cable 22 so as to raise the flexible pipe 24 that passes through the tensioner 10 until its upper end reaches a location for fixing it in the stationary production unit, as illustrated in FIG. 6d.

Once the flexible pipe has been installed by means of the system for auto-alignment and tensioning of the present disclosure, according to the steps described above, the flexible pipe is fixed to the supporting structures thereof and to the production systems.

In some embodiments, the step of connecting the main cable 22 to the upper end of the flexible pipe 24 is carried out on a floating vessel. In particular embodiments, fitting the tensioner 10 into the flexible pipe is also carried out on the floating vessel.

In some embodiments, the step of connecting an auxiliary cable 26 to the coupling pin 12p of the supporting fork 12 can be carried out by a remotely operated vehicle (ROV), making a diver unnecessary for this task.

Optionally, a pulley (not shown) is provided in the coupling device 16 to reduce the friction between the latter and the auxiliary cable 26 at the point of the change of direction of said auxiliary cable 26 on passing through the coupling device 16.

Thus, based on the above description, the present disclosure also provides a method for installing flexible pipes by means of the system of the present disclosure presented above, it being possible to carry out said method quickly and easily even in adverse sea conditions. In addition, the method of the present disclosure dispenses with the need for divers and, consequently, support ships for the diving operations.

Numerous variations falling within the scope of protection of the present application are permitted. Thus, it is stressed that the present disclosure is not limited to the configurations/particular embodiments described above.

Modification of the above-described apparatuses and methods, combinations between different variations as practicable, and variations of aspects of the invention that are obvious to those of skill in the art are intended to be within the spirit and scope of the claims.

What is claimed is:

1. A system for auto-alignment and tensioning of flexible pipes in a stationary production unit, said system comprising:

a tensioner provided with an internal opening suitable for passage of a flexible pipe from a first end of the tensioner to a second end of the tensioner opposite to the first end, a supporting fork, pivotally connected to the tensioner; and a coupling device which, at a first end, is configured to detachably connect to the supporting fork and, at a second end, is configured to connect to a stationary production unit, wherein the tensioner comprises an upper cone and a lower cone, the upper cone and the lower cone being fixed together and forming a double cone structure, and wherein fixation between the upper cone and the lower cone is carried out by a fixing ring.

2. A system according to claim 1, wherein the double cone structure is symmetrical.

3. A system according to claim 1, wherein the fixing ring is divided into two parts, each part having a conical internal profile suitable for locking the upper cone and the lower cone against one another when the two parts are passed over opposite ends of the double cone structure and pressed against one another.

4. A system according to claim 3, wherein the two parts of the fixing ring are locked against one another by at least one of screws, rivets, welds and recesses.

5. A system according to claim 1, wherein the supporting fork has a pivoted connection to the tensioner via the fixing ring.

6. A system according to claim 1, wherein the supporting fork comprises a coupling pin configured for detachable connection to the coupling device.

7. A system according to claim 6, wherein the coupling pin and the coupling device are configured for detachable connection by lockable fitting of the coupling pin in a pocket of the coupling device.

8. A system according to claim 7, wherein the coupling pin and the pocket are configured for lockable fitting by a recess provided on the coupling pin and a locking device positioned in the pocket of the coupling device, wherein the locking device is configured for engaging in the recess of the coupling pin.

9. A system according to claim 8, wherein the locking device comprises a tongue, the tongue being movable relative to the pocket between a retracted position and an extended position.

10. A system according to claim 9, wherein the tongue comprises a first surface that makes an acute angle with respect to an axis of the pocket along which the coupling pin is inserted, and a second surface substantially perpendicular to the axis.

11. A system according to claim 10, wherein an elastic device keeps the locking device in the extended position and allows the locking device to move to the retracted position when the first surface is pressed.

12. A system according to claim 1, wherein the first end of the tensioner is a bottom portion of the lower cone, and the second end of the tensioner is formed as a top portion of the upper cone.

13. A method for installing flexible pipes, wherein the method uses the system for auto-alignment and tensioning of flexible pipes in a stationary production unit, as defined in claim 1, the method comprising installing the flexible pipes.

14. A method for installing a flexible pipe, wherein the method comprises the steps of:
   providing a flexible pipe with a tensioner, the tensioner having a supporting fork pivotally attached to the tensioner through a pivoted connection;
   connecting a main cable to an upper end of the flexible pipe, the main cable being tensionable by a first tensioning device positioned in a stationary production unit;
   connecting an auxiliary cable to a coupling pin of the supporting fork, the auxiliary cable passing through a pocket of a coupling device and being tensionable by a second tensioning device positioned in the stationary production unit;
   tensioning the auxiliary cable until the coupling pin of the supporting fork enters the pocket of the coupling device and is secured therein by a locking device; and
   tensioning the main cable so as to raise the flexible pipe that passes through the tensioner until the upper end of the flexible pipe reaches a location for fixing the upper end in the stationary production unit.

15. A system for auto-alignment and tensioning of flexible pipes in a stationary production unit, said system comprising:
   a tensioner provided with an internal opening suitable for passage of a flexible pipe from a first end of the tensioner to a second end of the tensioner opposite to the first end,
   a supporting fork, pivotally connected to the tensioner; and
   a coupling device which, at a first end, is configured to detachably connect to the supporting fork and, at a second end, is configured to connect to a stationary production unit,
   wherein the supporting fork comprises a coupling pin configured for detachable connection to the coupling device, and
   wherein the coupling pin and the coupling device are configured for detachable connection by lockable fitting of the coupling pin in a pocket of the coupling device.

* * * * *